United States Patent [19]
Heyl

[11] Patent Number: 5,598,353
[45] Date of Patent: Jan. 28, 1997

[54] METHOD AND APPARATUS FOR COMBINING A MULTIPLE-BIT DIGITAL AUDIO SIGNAL WITH A SINGLE-BIT DIGITAL AUDIO SIGNAL

[75] Inventor: Lawrence F. Heyl, Mountain View, Calif.

[73] Assignee: Apple Computer, Inc., Cupertino, Calif.

[21] Appl. No.: 290,356

[22] Filed: Aug. 15, 1994

[51] Int. Cl.$^6$ ................................................. G06F 17/00
[52] U.S. Cl. ........................................................ 364/514 R
[58] Field of Search ............................... 364/514 R, 723, 364/724.1; 235/492; 381/24, 90; 361/683, 686; 341/143

[56] References Cited

U.S. PATENT DOCUMENTS

| | | | |
|---|---|---|---|
| 4,020,332 | 3/1977 | Crochiere et al. | 364/724.1 |
| 4,903,019 | 2/1990 | Ito | 341/61 |
| 5,019,819 | 3/1991 | Kimura | 341/143 |
| 5,079,551 | 6/1992 | Kimura et al. | 341/143 |
| 5,126,737 | 6/1992 | Torli | 341/61 |
| 5,347,587 | 9/1994 | Takahashi et al. | 381/117 |

OTHER PUBLICATIONS

Candy, James C., Temes, Gabor C., Titled "Oversampling Methods for A/D and D/A Converson", *Oversampling Delta–Sigma Data Converters—Theory, Design, and Simulation*, 1992 IEEE, pp. 1–25.

*Primary Examiner*—Ellis B. Ramirez
*Attorney, Agent, or Firm*—Blakely, Sokoloff, Taylor & Zafman

[57] ABSTRACT

An apparatus and method for combining a multiple-bit digital audio signal with a single bit audio signal is provided. A host computer receives a single-bit audio signal from one or more PCMCIA cards plugged into the host computer. The single-bit audio signal may be a simple beep, or may be a pulse width modulated (PWM) signal that encodes more sophisticated audio. The program audio generated in response to software executing on the host computer is typically encoded in a multiple-bit pulse code modulated (PCM) audio signal. The apparatus upsamples the multiple-bit PCM audio signal generated by circuitry on the host computer to produce a first upsampled PCM signal. The apparatus converts the PWM signal from the PCMCIA card(s) to produce a second upsampled PCM signal. The first and second upsampled PCM signals are merged in an interpolation circuit to produce a composite digital signal that encodes both the program audio and the sound carried on the PWM signal. The composite digital signal is convened to an analog signal, preferably using delta sigma modulation techniques. The analog signal is used to drive the speaker of the host computer.

19 Claims, 6 Drawing Sheets

METHOD AND APPARATUS FOR COMBINING A MULTIPLE-BIT DIGITAL AUDIO SIGNAL WITH A SINGLE-BIT DIGITAL AUDIO SIGNAL

FIELD OF THE INVENTION

The present invention relates to the reproduction of sound based on digital signals, and more specifically, to the reproduction of sound encoded in a single-bit digital signal and sound encoded in a multiple-bit digital signal on a single speaker.

BACKGROUND OF THE INVENTION

Recent advances in electronics packaging have increased the demand for feature-rich personal computers which occupy the same or less volume as presently available computer products. One such advance has been the packaging of memory and peripheral functions in a "credit card" size form factor defined by the Personal Computer Memory Card Industry Association (PCMCIA). One of the pins on the PCMCIA bus has been defined as a carrier for a "SpkrOut" signal.

The PCMCIA specification suggests that the SpkrOut pin should be operatively connected to the speaker of the host computer to allow a PCMCIA card to generate a sound on the speaker of the host computer. The ability of a PCMCIA card to generate sound may be helpful in a variety of situations. For example, a modem PCMCIA card can be designed to generate a signal over the SpkrOut pin to cause the host computer to "beep" (alert the user) when a remote computer is attempting to communicate with the host computer through the modem.

To support the suggested function of the SpkrOut pin, the host computer must include circuitry for generating sound on its speaker responsive to the signal on the SpkrOut pin. Support for the SpkrOut function is somewhat complicated by the fact that the speaker of the host computer must also generate sound responsive to software running on the host computer ("program audio"). Preferably, any sound generated from the PCMCIA card is generated in addition to, rather than instead of, any program audio. Some computers that have PCMCIA ports have implemented the SpkrOut function by (1) converting the PCMCIA signal to analog, (2) converting the program audio to analog, and (3) combining the two analog signals. The speaker of the host computer is then driven by the combined analog signal.

This analog signal combining process works well for relatively simple SpkrOut sound signals. For example, a PCMCIA card may generate a simple "beep" at the same time as the normal program audio by applying a simple square wave on the SpkrOut line. In host computers which support multiple PCMCIA slots, the various SpkrOut lines may be exclusive or'd (XOR) to generate a single term representing the sound outputs from multiple cards.

One disadvantage of this method of supporting the SpkrOut function is that it leads to duplication of circuitry. Specifically, both the program audio and the PCMCIA audio signals are converted to analog and processed before they are ultimately combined to drive the speaker. Further, the quality of the PCMCIA audio is relatively low.

In light of the foregoing, it is clearly desirable to provide a method and apparatus for driving a speaker based on a signal from one or more PCMCIA cards in addition to normal program audio. Further, it is desirable to process the PCMCIA audio signal with the same circuitry as is used to process the program audio. In addition, it is desirable to provide a system which supports pulse-width-modulated audio generated by PCMCIA cards, in addition to simple "beep" signals.

SUMMARY OF THE INVENTION

According to one aspect of the invention, an apparatus for generating a composite pulse code modulated (PCM) signal that represents sound from both a pulse code modulated signal and a pulse width modulated (PWM) signal is provided. The composite PCM signal is generated at a first sampling rate that is a multiple of a second sampling rate. The second sampling rate is the sampling rate of the pulse code modulated signal. The apparatus generally includes a PCM input line, a pulse width modulated input line, an upsample circuit, a PWM-to-PCM conversion circuit and an interpolation filter circuit.

The PCM line carries the pulse code modulated signal. The PWM input line carries the pulse width modulated signal. The upsample circuit is coupled to the PCM input line. The upsample circuit receives the PCM signal at the second sampling rate and generates a first upsampled PCM signal at the first sampling rate. According to one embodiment, the upsample circuit generates the first upsampled PCM signal by padding the PCM signal with zero-valued PCM samples.

The PWM-to-PCM conversion circuit is coupled to the PWM input line. The PWM-to-PCM conversion circuit receives the PWM signal and generates a second upsampled PCM signal based on the PWM signal. The PWM-to-PCM conversion circuit generates the second upsampled PCM signal at the first sampling rate.

The interpolation filter circuit is coupled to the upsample circuit and the PWM-to-PCM conversion circuit. The interpolation filter circuit receives the first upsampled PCM signal from the upsample circuit and the second upsampled PCM signal from the PWM-to-PCM conversion circuit. The interpolation filter circuit combines the upsampled PCM signal with the second upsampled PCM signal to generate the composite PCM signal.

To generate sound based on the composite PCM signal, the apparatus may include a digital-to-analog converter and a speaker. The digital-to-analog converter is coupled to the interpolation filter. The digital-to-analog converter generates an analog sound signal responsive to the composite PCM signal. The digital-to-analog converter drives the speaker with the analog sound signal to produce sound.

According to one embodiment, the digital-to-analog converter includes a delta sigma modulator and an analog low pass filter. The delta sigma modulator is coupled to the interpolation filter circuit. The delta sigma modulator receives the composite PCM signal and generates a first analog signal based on the composite PCM signal. The analog low pass filter is coupled to the delta sigma modulator. The analog low pass filter filters the first analog signal to produce a second analog signal based on the first analog signal. The analog sound signal is based on the second analog signal.

The PWM-to-PCM conversion circuit may include a sampling circuit, a shift register and a summation circuit. The sampling circuit is coupled to the PWM line. The sampling circuit samples the PWM signal to generate a sequence of bits. The shift register is coupled to the sampling circuit. The shift register stores a plurality of bits of the sequence of bits. The plurality of bits includes the bits of the sequence of bits most recently generated by the sampling circuit. The summation circuit is coupled to the shift register. The summation circuit generates the second upsampled PCM signal based upon the plurality of bits in the shift register.

The PWM-to-PCM conversion circuit may include a multiplication circuit for multiplying each bit of the plurality of bits by a corresponding coefficient to produce a plurality of product values. The summation circuit sums the plurality of product values to produce the second upsampled PCM signal. Alternatively, the summation circuit may simply sum the plurality of bits in the shift register to generate the second upsampled PCM signal as a moving average.

According to another aspect of the invention, an apparatus for use on a host computer for generating sound represented in a PWM signal generated by a PCMCIA card is provided. The apparatus generally includes a PWM-to-PCM converter, an upsample circuit, an interpolation circuit, a digital-to-analog converter circuit and a speaker.

The PWM-to-PCM converter has a PWM input and a PCM output. A single-bit line couples the PCMCIA card to the PWM input of the PWM-to-PCM converter. The upsample circuit has an input and an output. A multiple-bit line couples sound-producing circuitry on the host computer with the upsample circuit. The interpolation circuit has a first multiple-bit input, a second multiple-bit input and a multiple-bit output. The first multiple-bit input is coupled to the output of the upsample circuit. The second multiple-bit input is coupled to the output of the PWM-to-PCM converter.

The digital-to-analog converter circuit has a digital input and an analog output. The digital input of the digital-to-analog converter is coupled to the multiple-bit output of the interpolation circuit. The speaker is coupled to the analog output of the digital-to-analog converter.

According to another aspect of the invention, a method for producing sound on a speaker is provided, where a first component of the sound is initially encoded on a multiple-bit digital signal and a second component of the sound is initially encoded on a single-bit digital signal (e.g. PWM or delta sigma modulation sequences). According to the method, the multiple-bit digital signal is upsampled to produce a first upsampled multiple-bit signal. The single-bit digital signal is converted to a second upsampled multiple-bit signal. The first upsampled multiple-bit signal is filtered through a low pass filter in an interpolation circuit. The first upsampled multiple-bit signal is combined with the second upsampled multiple-bit signal in the low pass filter. The interpolation circuit generates a composite digital signal based on the first upsampled multiple-bit signal and the second upsampled multiple-bit signal. The composite digital signal is applied to a delta sigma modulator in tandem with a low-pass filter to generate an analog sound signal based on the composite digital signal. The speaker is driven to produce sound with the analog sound signal.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
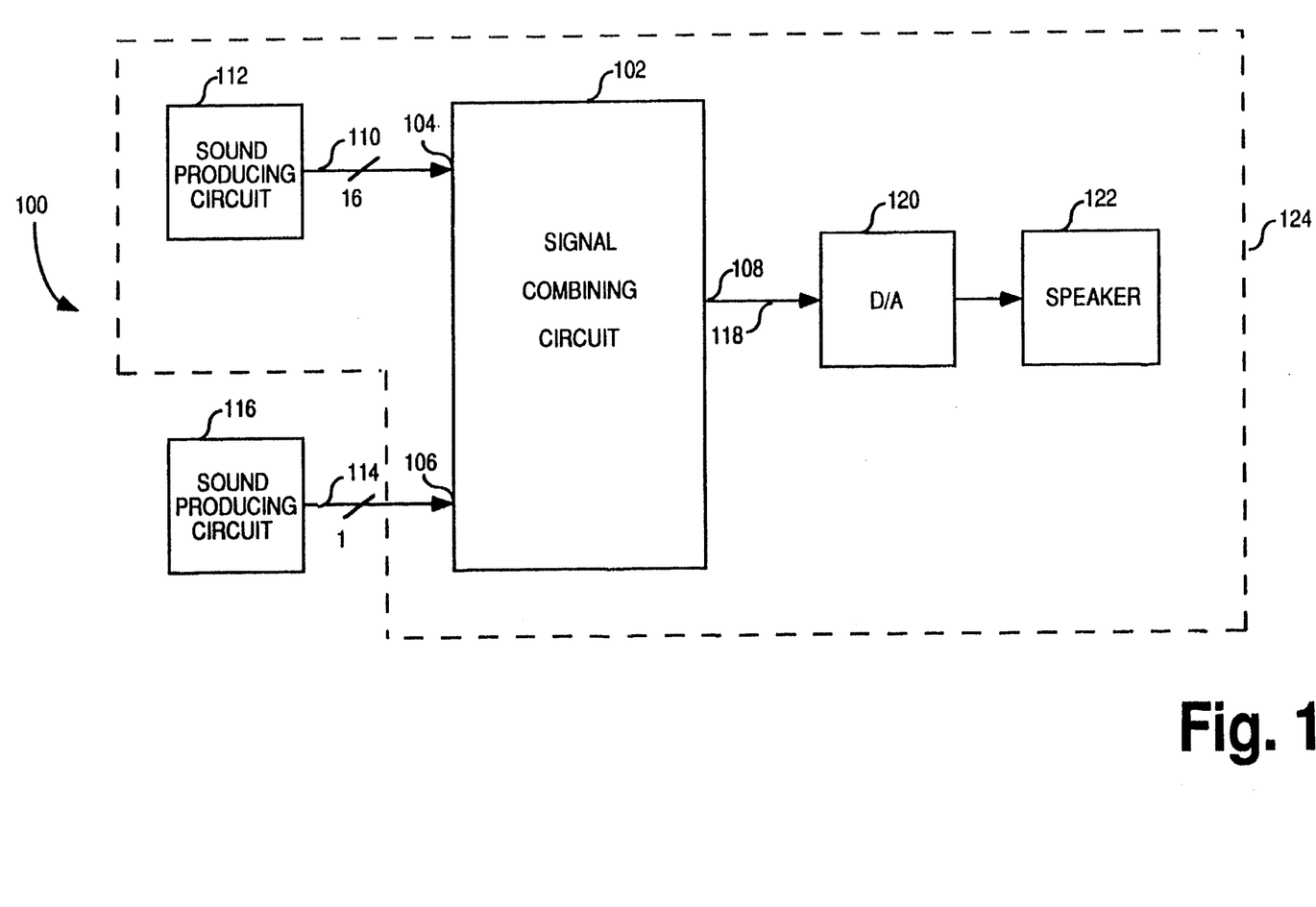
FIG. 1 is a block diagram illustrating a three port digital network according to one embodiment of the invention.

Referring to FIG. 1, it illustrates a three-port digital network 100 for combining a single-bit sound signal with a multiple-bit sound signal according to one embodiment of the invention. The three-port digital network 100 includes a signal combining circuit 102 with two input ports 104 and 106 and one output port 108. Input port 104 receives a multiple-bit sound signal over a multiple-bit line 110. For the purposes of explanation, it shall be assumed that line 110 is a sixteen-bit line which carries a sixteen-bit pulse code modulated (PCM) sound signal from a sound-producing circuit 112. In a typical application, sound-producing circuit 112 is circuitry of a host computer 124 executing software which causes the circuitry to generate a PCM sound signal.

Input port 106 receives a single-bit sound signal over a line 114. For the purposes of explanation, it shall be assumed that line 114 carries a pulse width modulated (PWM) sound signal generated by a second sound-producing circuit 116. In a typical application, sound-producing circuit 116 is a circuit on a PCMCIA card, and line 114 is the SpkrOut line connecting the PCMCIA card to host computer 124. As mentioned above, sound-producing circuit 116 may alternatively be a plurality of PCMCIA cards, in which case the signal on line 114 is a signal generated by performing an exclusive OR on the SpkrOut signals generated by the PCMCIA cards.

Signal combining circuit 102 processes the digital sound signals applied to ports 104 and 106 and combines them to produce a composite digital sound signal at port 108. The digital signal at port 108 encodes the sounds that are represented on both of the input audio signals. The composite digital signal may then be sent over a line 118 to a digital-to-analog converter 120 to generate an analog sound signal. The analog sound signal may then be used to drive a speaker 122 on the host computer 124.

Because the two digital sound signals are combined in a single composite digital signal, only one digital-to-analog converter 120 is required. In addition, the sound generated by sound-producing circuit 116 may be processed to enhance sound quality in the same manner as the sound from sound-producing circuit 112 without redundant processing resources, since the processing may be performed on the composite signal rather than on both signals separately. In addition, by routing PWM signals from a PCMCIA card to a speaker in this manner, the need for operating system intervention is avoided. This is particularly useful on portable computers with a "sleep" mode, since operating system intervention may arouse such computers from sleep mode, causing an unnecessary increase in power usage. Various embodiments of signal combining circuit 102 shall now be described with reference to FIGS. 2–6.

Figure 2:
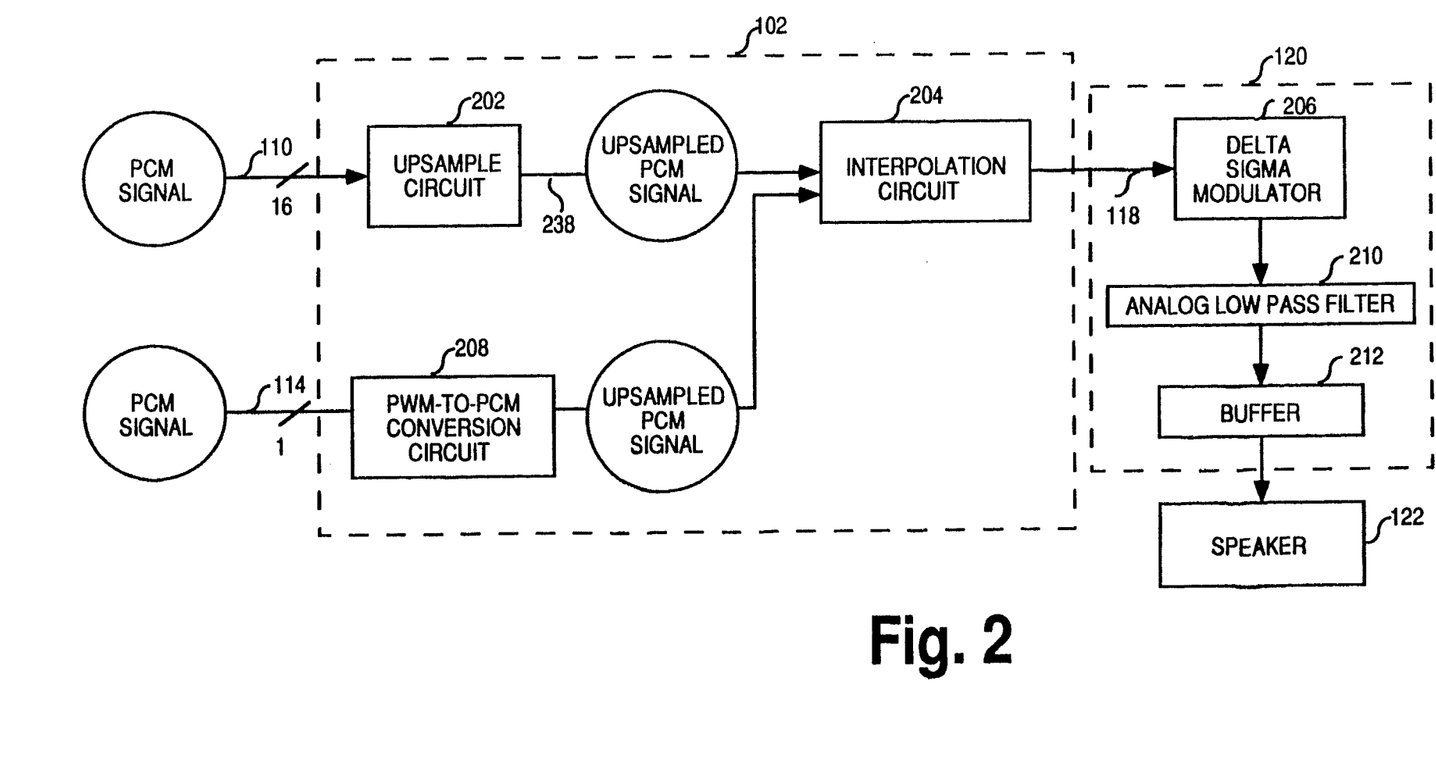
FIG. 2 is a block diagram illustrating the signal combining circuit of FIG. 1.

Referring to FIG. 2, it illustrates one embodiment of signal combining circuit 102. According to this embodiment, signal combining circuit 102 includes an upsample circuit 202, an interpolation circuit 204, and a PWM-to-PCM conversion circuit 208. Combining circuit 102 combines the signals on lines 110 and 114 and sends the combined signal to digital-to-analog converter 120. Digital-to-analog converter 120 drives speaker 122 with the analog sound signal to produce sound.

According to the illustrated embodiment of the invention, digital-to-analog converter 120 includes a delta sigma modulator 206, an analog low pass filter 210 and a buffer 212. Delta sigma modulator 206 generates an analog signal from the upsampled digital sound signal received from interpolation circuit 204 according to noise shaped delta sigma modulation techniques. Delta sigma modulation techniques are described by James C. Candy and Gabor C. Temes in "Oversampling Methods for A/D and D/A Conversion" in OVERSAMPLING DELTA-SIGMA DATA CONVERTERS: THEORY, DESIGN, AND SIMULATION, New York: IEEE Press, 1992, pp. 1–25. The analog sound signal generated by delta sigma modulator 206 is preferably passed through analog low pass filter 210 and buffer 212 before driving speaker 122.

Prior to converting a PCM sound signal using delta sigma modulation techniques, the PCM data must first be upsampled. The PCM signal on line 110 is upsampled by upsample circuit 202. For the purposes of explanation, it will be assumed that the PCM data on line 110 is initially sampled at 44.1 kHz. Therefore, upsample circuit 202 receives PCM data over line 110 at this original sampling rate. To upsample the PCM signal, upsample circuit 202 must generate PCM data at a multiple of the sampling rate of the original PCM data. For the purposes of explanation, it shall be assumed that upsample circuit 202 is a 64x upsample circuit. Therefore, upsample circuit 202 will generate PCM data over line 238 at 2.8 MHz.

To perform this upsampling, upsample circuit 202 generates 63 intervening PCM samples between each original PCM sample. In the preferred embodiment, the intervening PCM samples have the value of zero. The upsampled PCM data, consisting of the original PCM data padded with 63 intervening zero-valued PCM samples, is transmitted to interpolation circuit 204 over line 238.

Interpolation circuit 204 is a digital low pass finite impulse response (FIR) filter. In the present example, the FIR filter of interpolation circuit 204 preferably has a cutoff frequency of approximately 20 kHz. Interpolation circuit 204 filters the upsampled PCM values and prunes the high order spectral images formed during the upsampling process. Consequently, the output of interpolation circuit 204 is a sixteen-bit sound signal with a cutoff frequency of 20 kHz. These filtered PCM values are generated by interpolation circuit 204 at the upsampled to 2.8 MHz.

In the preferred embodiment of the invention, the signal generated by interpolation circuit 204 carries the sound initially encoded on the PWM signal on line 114 as well as the sound initially encoded on the PCM signal on line 114. Before the PWM signal on line 114 can be combined with the upsampled PCM signal on line 238, the PWM signal is first converted to a PCM signal.

The PWM-to-PCM conversion process is performed by PWM-to-PCM conversion circuit 208. As shall be explained hereafter, the PWM signal is upsampled during the PWM-to-PCM conversion process. Preferably, the PWM on line 114 signal is upsampled at the same rate that upsample circuit 202 upsamples the signal on line 110. Consequently, the output of PWM-to-PCM conversion circuit 208 is a second upsampled PCM signal. The upsampled PCM data from PWM-to-PCM conversion circuit 208 is sent to interpolation circuit 204 along with the upsampled program audio PCM data from upsample circuit 202. As will be explained hereafter, the two upsampled PCM data signals are combined by interpolation circuit 204 during the interpolation process.

Figure 3:
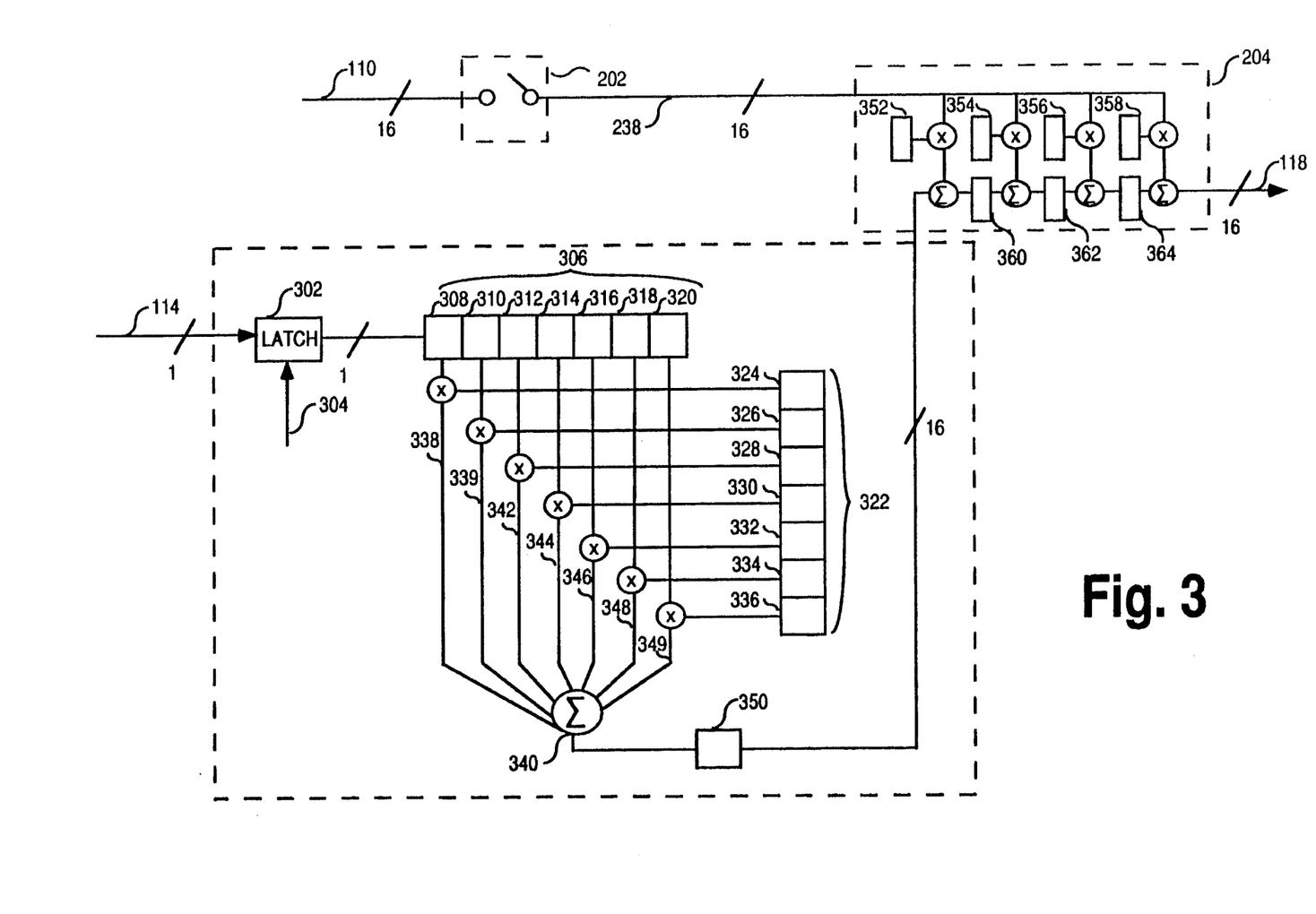
FIG. 3 illustrates the PWM-to-PCM conversion circuit and the interpolation circuit of FIG. 2 according to one embodiment of the invention.

Referring to FIG. 3, PWM-to-PCM conversion circuit 208 and interpolation circuit 204 are illustrated in greater detail. PWM-to-PCM conversion circuit 208 generally includes a latch 302, a single bit wide shift register 306, a set of coefficient registers 322, and a summation circuit 340. As is known in the art, data is encoded in a pulse width modulated signal by varying the duration of pulses in the signal. Each pulse is generated during a time period of a predetermined length. The maximum encoded value for a PWM signal with a given period is represented by a pulse which remains high for the entire period, while the minimum encoded value is represented by no pulse during the entire period (i.e. the PWM signal remains low for the entire period).

The PWM signal on line 114 is sampled at a rate higher than the period of the PWM signal to produce a series of single-bit samples during each period. The samples taken while the PWM signal high are represented by ones, while the samples taken while the PWM signal is low are represented by zeros. This sampling process may be performed by applying the PWM signal to latch 302 and clocking the latch 302 over a line 304 at the desired sampling rate. In the preferred embodiment, the sampling rate of the PWM signal on line 114 is the same rate to which the PCM values on line 110 are upsampled by upsample circuit 202.

The sequence of bits resulting from this sampling process is shifted into shift register 306. Specifically, latch 302 may be clocked at time $T_1$. If the signal on line 114 is high at time $T_1$, then a 1 is latched into register 308 of shift register 306. At time $T_2$, the 1 is shifted into register 310, and at time $T_3$ it is shifted into register 312. During each sampling period, a new sample of the signal on line 114 is taken and latched into shift register 306. Consequently, at time $T_7$, register 320 will contain a sample taken at time $T_1$, register 318 will contain a sample taken at time $T_2$, and register 316 will contain a sample taken at time $T_3$. Register 314 will contain a sample taken at $T_4$, register 312 will contain a sample taken at $T_5$, register 310 will contain a sample taken at $T_6$, and register 308 will contain a sample taken at $T_7$.

Registers 322 contain filter kernel values for filtering the PWM signal on line 114. Specifically, during each clock cycle, the value in register 308 is multiplied by a coefficient stored in register 324, and the product of this operation is sent to summation circuit 340 over a line 338. The value in register 310 is multiplied by the coefficient stored in register 326, and the product of this operation is sent to summation circuit 340 over a line 339. Similarly, the value in register 312 is multiplied by the coefficient stored in register 328, and the product of this operation is sent to summation circuit 340 over a line 342. Operations are performed with the remaining registers in a similar fashion. Consequently, at the end of each clock cycle, summation circuit 340 will receive the products produced by multiplying the contents of registers 308, 310, 312, 314, 316, 318 and 320 with the contents of registers 324, 326, 328, 330, 332, 334 and 336, respectively. Summation circuit 340 sums these products and transmits the result to register 350. The result is a multiple-bit filtered value representative of the audio information encoded in the PWM signal on line 114.

Upsample circuit 202 is symbolically represented as a switch which closes to transmit the PCM value on line 110 during one sampling interval, but remains open to generate 0-valued samples to interpolation circuit 204 during 63 subsequent sampling intervals. Consequently, the PCM signal applied to interpolation circuit 204 over line 238 will have a sampling rate 64 times the original sampling rate of the PCM signal on line 110.

Interpolation circuit 204 includes an FIR filter having a plurality of coefficient registers 352, 354, 356, and 358, and a plurality of product registers 360, 362, and 64. During each clock cycle, the value of the upsampled PCM signal on line 238 is multiplied by coefficient values (filter kernel values) contained in each of registers 352, 354, 356, and 358. The product of each of these multiplication operations is summed with a value and stored in a register. Specifically, the product of the PCM sample on line 238 (the "current PCM sample") and the coefficient stored in register 352 is summed with the contents of register 350 and stored in register 360. The product of the current PCM sample and the coefficient stored in register 354 is summed with the previous contents of register 360 and stored in register 362. The product of the current PCM sample and the coefficient stored in register 356 is summed with the previous contents of register 362 and stored in register 364. The product of the current PCM sample and the coefficient stored in register 358 is summed with the previous contents of register 364 and transmitted to delta sigma modulator 206 over line 118.

As explained above, the value in register 350 represents the sound encoded in the PWM signal on line 114. This value is summed with the product of the current PCM sample and the coefficient stored in register 352. The value resulting from this summation propagates through interpolation circuit 204, is augmented by the products of subsequent multiplication operations, to eventually be transmitted to delta sigma modulator 206 over line 118. Consequently, the output of interpolation circuit 204 encodes both the sound represented in the PCM signal on line 110, and the sound represented in the PWM signal on line 114. Because the sound from both of these sound signals has been combined into a single, filtered, upsampled PCM signal, a second digital-to-analog circuit is not needed to in order to process the two original sound signals.

For the purpose of explanation, interpolation circuit 204 has been illustrated with only a four stage (or tap) filter. Typically, the number of stages in the filter will vary based on the upsampling rate. For a circuit which upsamples at a rate of 64 times the original sampling rate, interpolation circuit 204 may have 128 stages or more.

Figure 4:
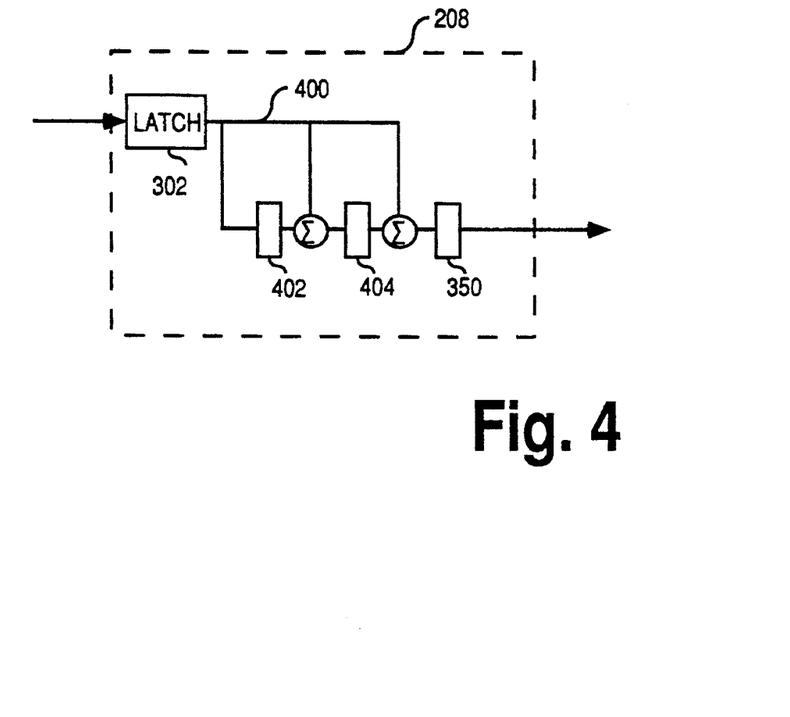
FIG. 4 illustrates an alternative embodiment for a PWM-to-PCM conversion circuit.
Figure 5:
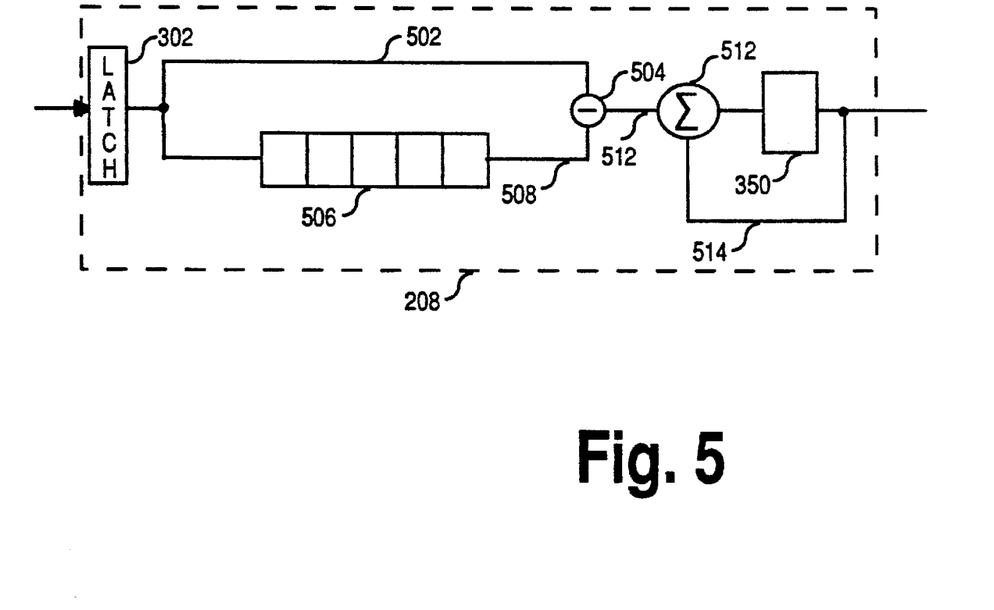
FIG. 5 illustrates another alternative embodiment for a PWM-to-PCM conversion circuit.

While FIG. 3 illustrates one embodiment of PWM-to-PCM conversion circuit 208, the present invention is not limited to the illustrated embodiment. For example, if less rigorous band limiting of the PWM signal on line 114 is needed, the kernel filter values may be set to 1. When all of the kernel values are set to 1, the output of summation circuit 340 will simply be the number of one bits in shift register 306. This value, which is sent to register 350, is simply an N point moving average, where N is the number of storage locations in shift register 306. In this embodiment, register 322 is superfluous since 1 is the identity operator for multiplication. Consequently, in one embodiment of the invention, the values in shift register 306 may be sent directly to summation circuit 340. PWM-to-PCM conversion circuit 208 may therefore be characterized as an N point moving average low pass filter. FIGS. 4 and 5 show alternate embodiments of an N point moving average low pass filter.

Referring now to FIG. 4, an alternate embodiment of PWM-to-PCM conversion unit 208 includes a plurality of registers 402 and 404. The output of latch 302 (the "new sample value") is generated over a line 400. The new sample value, which will be either a one or a zero, is stored into register 402. In addition, the new sample value is summed with the previous contents of register 402. The value resulting from this summation is stored in register 404. The new sample value is also summed with the previous contents of register 404. The value resulting from this summation is stored in register 350. Consequently, at the end of each sampling interval, register 350 will contain a number generated by summing the N previous outputs of latch 302.

FIG. 5 is an alternative embodiment of the PWM-to-PCM conversion circuit 208 illustrated in FIG. 4. The PWM-to-PCM conversion circuit 208 in FIG. 5 implements an N point moving average low pass filter. The output of a moving average low pass filter may be represented mathematically by the equation $y(n)=y(n-1)+x(n)-x(n-N)$, where y is output of the moving average low pass filter, and x is the input value to the filter (the value generated by latch 302), n is the current sampling interval, and N is the number of stages in the moving average filter.

At any given time N, the current output of latch 302, $x(n)$, is conveyed on a line 502 to a subtraction circuit 504, and shifted into a shift register 506. The oldest sample in shift register 506, $x(n-N)$, is shifted out of the shift register 506 onto line 508. Subtraction circuit 504 subtracts the value on line 508 from the value on line 502. The result of this operation is transmitted over a line 510 to a summation circuit 512. Summation circuit 512 sums the value on line 510 with the previous contents of register 350 which are conveyed to summation circuit 512 over a line 514. The result of this summation is stored in register 350. Consequently, at any given time n, the contents of register 350 will equal $y(n-1)+x(n)-x(n-N)$.

Figure 6:
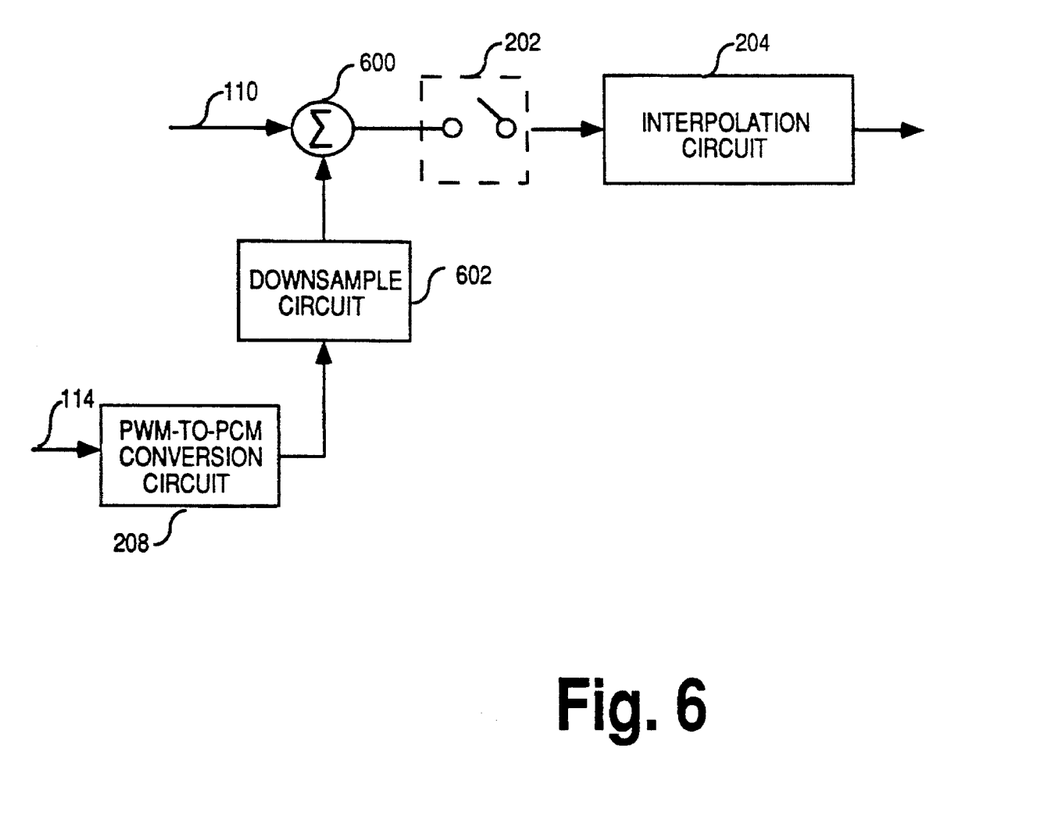
FIG. 6 is a block diagram illustrating an alternative embodiment of a signal combining circuit in which two audio signals are combined prior to upsampling.

In the embodiments of the invention discussed so far, a PCM value representing the sound on a PWM signal is combined with a program audio PCM sound signal after the program audio sound signal has been upsampled. However, as shown in FIG. 6, the two PCM signals may be combined prior to the upsampling of the program audio PCM signal. Specifically, a summation circuit 600 may be configured to sum the PCM signal on line 110 with the PCM output of PWM-to-PCM conversion circuit 208 prior to the upsampling of the program audio PCM signal by upsample circuit 202. However, as has been explained above, the PWM-to-PCM conversion process performed on the original PWM audio signal results in an upsampled PCM signal. Consequently, the output of PWM-to-PCM conversion circuit 208 will typically reflect a higher sampling rate than the sampling rate of the program audio PCM signal on line 110. Therefore, before the two PCM signals can be summed by a summation circuit 600, the PCM output of PWM-to-PCM conversion circuit 208 must first be down-sampled by a down-sampling circuit 602.

Figure 7:
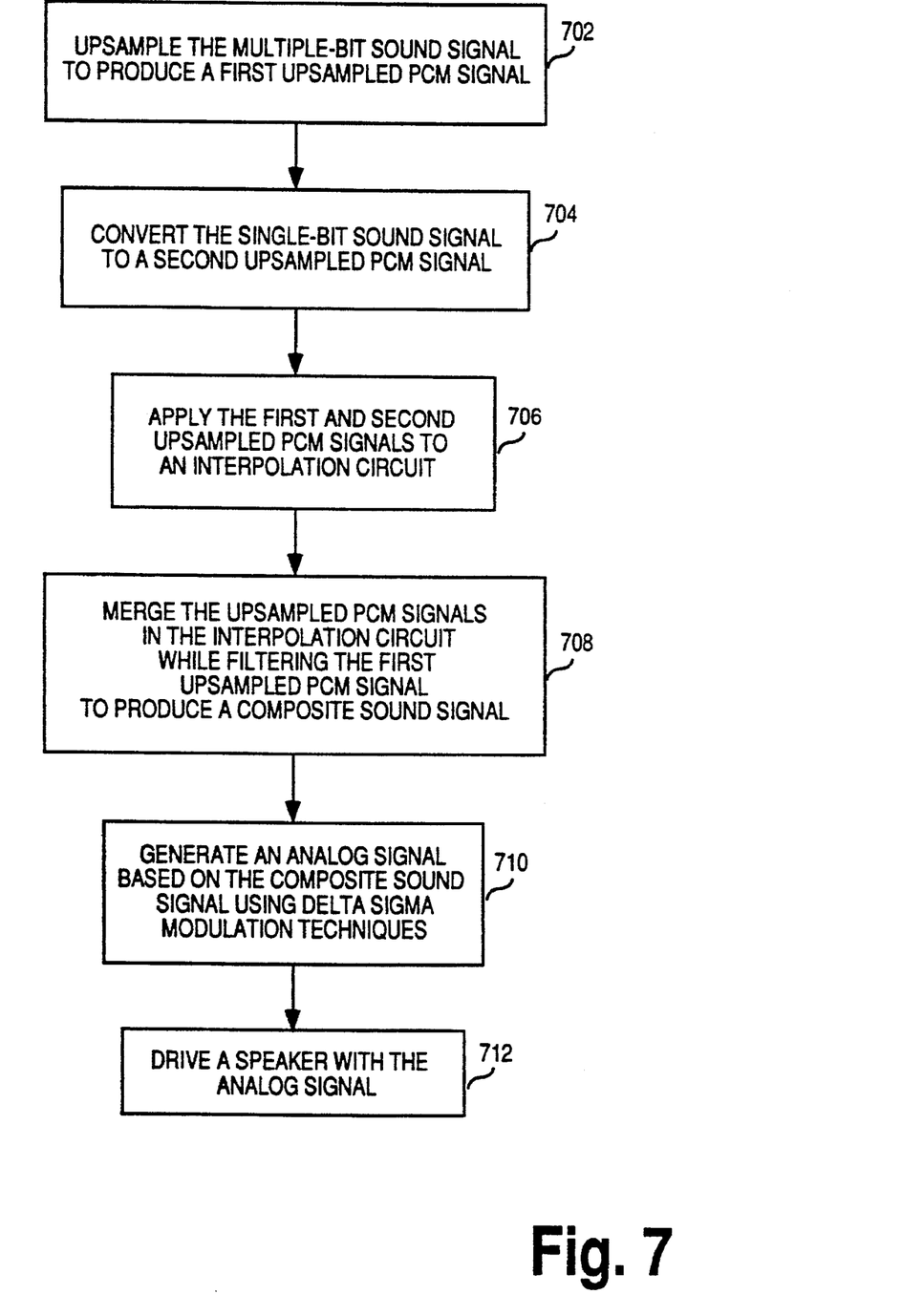
FIG. 7 is a flow chart of a method for combining two audio signals.

Referring now to FIG. 7, it illustrates a flow chart of a method for combining a multiple-bit digital sound signal with a single-bit digital sound signal according to one embodiment of the invention. At step 702, the multiple-bit sound signal is upsampled to produce a first upsampled PCM signal. As explained above, this upsampling process is preferably performed by upsample circuit 202, which pads an original PCM signal with intervening 0-valued PCM samples.

At step 704, the single-bit sound signal is converted to a second upsampled PCM signal. As explained above, the single-bit audio signal may encode sound using pulse width modulation. The PWM-to-PCM conversion process may be performed by PWM-to-PCM conversion circuit 208 by sampling the PWM signal and summing the samples in a filter circuit. In one embodiment, the filter circuit may simply compute a moving average based on samples taken of the PWM signal.

At step 706, the first and second upsampled PCM signals are applied to an interpolation circuit. The interpolation circuit filters the first upsampled PCM signal and merges the two upsampled PCM signals to produce a composite digital sound signal. The composite sound signal is a multiple-bit digital PCM signal which encodes the sound represented on the both the original multiple-bit sound signal and the original single-bit sound signal.

At step 710, an analog signal is generated based on the composite digital sound signal. In the preferred embodiment, delta sigma modulation techniques are used to convert the composite digital sound signal to the analog signal. Finally, at step 712, the analog signal is used to drive a speaker.

A circuit and method for combining a single-bit sound signal with a multiple-bit sound signal have been described herein. Because the signals are combined while yet in the digital domain, a single digital to analog converting circuit may be used to reproduce on a single speaker the sound initially carded on both signals. The circuit may be implemented in host computers which support one or more PCMCIA slots. PCMCIA cards inserted in such slots may produce either a simple square wave "beep", or PWM encoded audio data on the line of the PCMCIA bus designated as "SpkrOut". As described above, the PWM signal is converted to a PCM signal by a PWM-to-PCM conversion circuit, and the resulting PCM values are combined with an upsampled PCM sound signal generated by the host computer's software. The two upsampled PCM signals are combined in an interpolation circuit and then preferably fed to a delta sigma modulator. Alternatively, the PCM data generated from the original PWM signal may be downsampled and combined with the original program audio sound data prior to upsampling.

While specific embodiments of the present invention have been described, various modifications and substitutions will become apparent to one skilled in the art by this disclosure. Such modifications and substitutions are within the scope of the present invention, and are intended to be covered by the following claims.

What is claimed is:

1. An apparatus for generating a composite PCM signal at a first sampling rate, the first sampling rate being a multiple of a second sampling rate, the composite PCM signal representing sound from both a pulse code modulated signal generated at the second sampling rate and a pulse width modulated signal, comprising:

a PCM input line carrying said pulse code modulated signal;

a PWM input line carrying said pulse width modulated signal;

an upsample circuit coupled to the PCM input line, the upsample circuit receiving the PCM signal at said second sampling rate and generating a first upsampled PCM signal at said first sampling rate;

a PWM-to-PCM conversion circuit coupled to the PWM input line, the PWM-to-PCM conversion circuit receiving the PWM signal and generating a second upsampled PCM signal based on said PWM signal, wherein the PWM-to-PCM conversion circuit generates the second upsampled PCM signal at the first sampling rate; and an interpolation filter circuit coupled to the upsample circuit and the PWM-to-PCM conversion circuit, the interpolation filter circuit receiving the first upsampled PCM signal from the upsample circuit and the second upsampled PCM signal from the PWM-to-PCM conversion circuit, wherein the interpolation filter circuit combines the upsampled PCM signal with the second upsampled PCM signal to generate the composite PCM signal.

2. The apparatus of claim 1 wherein the upsample circuit generates the first upsampled PCM signal by padding the PCM signal with zero-valued PCM samples.

3. The apparatus of claim 1 further comprising:

a digital-to-analog converter coupled to the interpolation filter, the digital-to-analog converter generating an analog sound signal responsive to the composite PCM signal; and a speaker coupled to the digital-to-analog converter, the digital-to-analog converter driving the speaker with the analog sound signal to produce sound.

4. The apparatus of claim 3 wherein the digital-to-analog converter includes:

a delta sigma modulator coupled to the interpolation filter circuit; the delta sigma modulator receiving the composite PCM signal and generating a first analog signal based on the composite PCM signal;

an analog low pass filter coupled to the delta sigma modulator, the analog low pass filter filtering the first analog signal to produce a second analog signal based on the first analog signal, wherein the analog sound signal is based on the second analog signal.

5. The apparatus of claim 1 wherein the PWM-to-PCM conversion circuit includes:

a sampling circuit coupled to the PWM line, the sampling circuit sampling the PWM signal to generate a sequence of bits;

a shift register coupled to the sampling circuit, the shift register storing a plurality of bits of said sequence of bits, the plurality of bits being the bits of said sequence of bits most recently generated by the sampling circuit;

a summation circuit coupled to the shift register, the summation circuit generating said second upsampled PCM signal based upon said plurality of bits.

6. The apparatus of claim 5 wherein the PWM-to-PCM conversion circuit includes a multiplication circuit for multiplying each bit of the plurality of bits by a corresponding coefficient to produce a plurality of product values, the summation circuit summing the plurality of product values to produce the second upsampled PCM signal.

7. The apparatus of claim 5 wherein the summation circuit sums plurality of bits to generate the second upsampled PCM signal as a moving average.

8. The apparatus of claim 1 wherein:

the upsample circuit, the PWM-to-PCM conversion circuit and the interpolation circuit reside in a host computer, the PWM input line couples the host computer to PWM audio signal producing circuitry on a PCMCIA card, and the PCM input line couples the upsample circuit to PCM audio signal producing circuitry on the host computer.

9. A method for producing sound on a speaker, wherein a first component of the sound is initially encoded on a multiple-bit digital signal and a second component of the sound is initially encoded on a single-bit digital signal, the method comprising the steps of:

upsampling the multiple-bit digital signal to produce a first upsampled multiple-bit signal;

converting the single-bit digital signal to a second upsampled multiple-bit signal;

filtering the first upsampled multiple-bit signal through a low pass filter in an interpolation circuit;

combining the first upsampled multiple-bit signal with the second upsampled multiple-bit signal in the low pass filter, the interpolation circuit generating a composite digital signal based on the first upsampled multiple-bit signal and the second upsampled multiple-bit signal;

applying the composite digital signal to a delta sigma modulator to generate an analog sound signal based on the composite digital signal; and driving the speaker with the analog sound signal.

10. The method of claim 9 wherein the multiple-bit digital signal is a PCM signal, the step of upsampling the multiple-bit digital signal including upsampling the PCM signal.

11. The method of claim 10 wherein the step of upsampling the PCM signal includes generating a plurality of zero-valued PCM samples between each PCM value in the PCM signal.

12. The method of claim 9 wherein the single-bit digital signal is a PWM signal, the step of convening the single-bit digital signal including the steps of:

sampling the PWM signal to generate a series of bits; and filtering the series of bits to produce the second upsampled multiple-bit signal.

13. The method of claim 12 wherein the step of filtering includes repeatedly performing the steps of:

shifting the series of bits through a shift register;

multiplying the bits in the shift register by a plurality of filter kernel values to produce a plurality of product values;

summing the product values to produce the second upsampled multiple-bit signal.

14. The method of claim 12 wherein the step of filtering includes repeatedly performing the steps of:

shifting the series of bits through a shift register; and summing a portion of the series of bits to produce the second upsampled multiple-bit signal, the portion being the bits of the series of bits that are currently stored in the shift register.

15. The method of claim 12 wherein the step of filtering includes repeatedly performing the steps of:

subtracting a previous bit of the series of bits from a current bit of the series of bits to produce a difference value, the previous bit being a sample taken N sampling periods prior to the current bit; and adding the difference value to a cumulative value representing the sum of N previous bits of the series of bits.

16. An apparatus for use on a host computer for generating sound represented in a PWM signal generated by a PCMCIA card, the apparatus comprising:

a PWM-to-PCM converter with a PWM input and a PCM output;

a single-bit line coupling the PCMCIA card to the PWM input of the PWM-to-PCM converter;

an upsample circuit having an input and an output;

a multiple-bit line coupling sound-producing circuitry on the host computer with the upsample circuit;

an interpolation circuit having a first multiple-bit input, a second multiple-bit input and a multiple-bit output, the first multiple-bit input being coupled to the output of the upsample circuit, the second multiple-bit input being coupled to the output of the PWM-to-PCM converter;

a digital-to-analog converter circuit having a digital input and an analog output, the digital input of the digital-to-analog converter being coupled to the multiple-bit output of the interpolation circuit; and a speaker coupled to the analog output of the digital-to-analog converter.

17. The apparatus of claim 16 wherein the digital-to-analog converter circuit includes a delta sigma modulator circuit coupled to the interpolation circuit and an analog low pass filter coupled to the delta sigma modulator circuit.

18. The apparatus of claim 16 wherein the PWM-to-PCM circuit includes:

a sampling circuit coupled to the single-bit line;

a shift register coupled to the sampling circuit; and a summation circuit coupled to the shift register.

19. The apparatus of claim 18 wherein the PWM-to-PCM circuit further includes a plurality of coefficient registers and a multiplication circuit, the multiplication circuit being operatively coupled to the plurality of coefficient registers, the shift register and the summation circuit, the multiplication circuit multiplying each bit of a plurality of bits in the shift register by a corresponding coefficient of a plurality of coefficients stored in the plurality of coefficient registers to produce a plurality of product values, the summation circuit summing the plurality of product values.

* * * * *

UNITED STATES PATENT AND TRADEMARK OFFICE
CERTIFICATE OF CORRECTION

PATENT NO. : 5,598,353
DATED : January 28, 1997
INVENTOR(S) : Lawrence F. Heyl

It is certified that error appears in the above-indentified patent and that said Letters Patent is hereby corrected as shown below:

In the Title Page at [57] at lines 18-19 delete "convened"
and insert --converted--

In Column 11 at line 28 delete "convening" and insert --converting--.

Signed and Sealed this

Twenty-fifth Day of November, 1997

Attest:

BRUCE LEHMAN

Attesting Officer

Commissioner of Patents and Trademarks